US009064504B1

United States Patent
Sannino et al.

(10) Patent No.: US 9,064,504 B1
(45) Date of Patent: Jun. 23, 2015

(54) ELECTRONIC SYSTEM WITH MEDIA RECOVERY MECHANISM AND METHOD OF OPERATION THEREOF

(71) Applicant: Western Digital Technologies, Inc., Irvine, CA (US)

(72) Inventors: Anthony P. Sannino, Morgan Hill, CA (US); William B. Boyle, Lake Forest, CA (US); Bernhard Hiller, San Jose, CA (US); Jih-Ping Peng, Saratoga, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/260,641

(22) Filed: Apr. 24, 2014

Related U.S. Application Data

(60) Provisional application No. 61/933,139, filed on Jan. 29, 2014.

(51) Int. Cl.
*G11B 21/02* (2006.01)
*G11B 5/02* (2006.01)
*G11B 21/08* (2006.01)
*G11B 5/60* (2006.01)

(52) U.S. Cl.
CPC *G11B 5/02* (2013.01); *G11B 21/08* (2013.01); *G11B 5/6076* (2013.01); *G11B 5/6064* (2013.01); *G11B 5/6005* (2013.01)

(58) Field of Classification Search
CPC .... G11B 5/10; G11B 5/5521; G11B 5/59633; G11B 19/2054; G11B 5/455; G11B 20/10009; G11B 220/1836; G11B 5/5543; G11B 5/5547; G11B 20/1217; G11B 27/36; G11B 5/59627; G11B 21/02; G11B 5/02; G11B 5/6005; G11B 5/6064

USPC ............ 360/63, 69, 75, 55, 78.08, 53, 77.04, 360/48, 31, 51, 235.1, 235, 4, 235.5, 70

See application file for complete search history.

(56) References Cited

U.S. PATENT DOCUMENTS

| | | |
|---|---|---|
| 4,490,766 A | 12/1984 | Hill et al. |
| 5,850,321 A | 12/1998 | McNeil et al. |
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |

(Continued)

OTHER PUBLICATIONS

Ralf Brunner, U.S. Appl. No. 13/903,464, filed May 28, 2013, 22 pages.

(Continued)

*Primary Examiner* — Ali Neyzari (57) ABSTRACT

An apparatus includes: a media; a head over the media; and control circuitry, coupled to the heads, configured to: select an operational head from the heads based on margin data collected under a lube waterfall condition, and perform an access to the media with the operational head.

20 Claims, 3 Drawing Sheets

(56) References Cited

U.S. PATENT DOCUMENTS

| | | |
|---|---|---|
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,356,405 B1 | 3/2002 | Gui et al. |
| 6,369,969 B1 | 4/2002 | Christiansen et al. |
| 6,373,658 B2 * | 4/2002 | Gui et al. ............ 360/234.1 |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,168 B1 | 12/2002 | French et al. |
| 6,493,173 B1 | 12/2002 | Kim et al. |
| 6,493,184 B1 | 12/2002 | Smith |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,760,175 B2 | 7/2004 | Smith |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |

(56) References Cited

U.S. PATENT DOCUMENTS

| | | |
|---|---|---|
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,817,372 B2 * | 10/2010 | Takahashi .......... 360/75 |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,068,306 B2 * | 11/2011 | Ramamoorthy et al. .......... 360/75 |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |

(56) References Cited

U.S. PATENT DOCUMENTS

| | | |
|---|---|---|
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,174,782 B2 * | 5/2012 | Feliss et al. .................... 360/31 |
| 8,174,794 B2 * | 5/2012 | Dorius ..................... 360/235.1 |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Pruett et al. |
| 8,756,382 B1 | 6/2014 | Carlson et al. |
| 8,838,995 B2 * | 9/2014 | Meyer et al. .................. 713/189 |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

OTHER PUBLICATIONS

C. Mathrew Mate, et al., Lubricant-Induced Spacing Increases at Slider-Disk Interfaces in Disk Drives, Tribol Letter, vol. 37, 2010, pp. 581-590.

B. Marchon, et al., "Lubricant Dynamics on a Slider: The Waterfall Effect," Journal of Applied Physics 105, 074313-074313-5, 2009.

* cited by examiner

ELECTRONIC SYSTEM WITH MEDIA RECOVERY MECHANISM AND METHOD OF OPERATION THEREOF

CROSS-REFERENCE TO RELATED APPLICATION

This application claims the benefit of U.S. Provisional Patent Application Ser. No. 61/933,139 filed Jan. 29, 2014, and the subject matter thereof is incorporated herein by reference thereto.

TECHNICAL FIELD

An embodiment relates generally to an electronic system, and more particularly to a system for media test and use.

BACKGROUND

Modern consumer and industrial electronic devices require storage of information, such as digital photographs, electronic mail, calendar, or contacts. These devices can be electronic systems, such as notebook computers, desktop computers, servers, televisions, and projectors, and are providing increasing levels of functionality to support modern life. Increased capacity and cost reductions are an ongoing market demand for storage in these systems.

Research and development in the existing technologies can take a myriad of different directions. One way to increase performance and reduce cost at the same time is to provide reliable products without excessively screening out potentially good products.

DETAILED DESCRIPTION

A need still remains for an electronic system with media recovery mechanism for improving yield and performance when writing. The improved yield and performance can be provided recognition and coping with transient conditions and treating it as a transient condition as oppose to a permanent condition. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

Certain embodiments have other steps or elements in addition to or in place of those mentioned above. The steps or elements will become apparent to those skilled in the art from a reading of the following detailed description when taken with reference to the accompanying drawings.

The following embodiments are described in sufficient detail to enable those skilled in the art to make and use the embodiments. It is to be understood that other embodiments would be evident based on the present disclosure, and that system, process, or mechanical changes may be made without departing from the scope of an embodiment.

In the following description, numerous specific details are given to provide a thorough understanding of the embodiments. However, it will be apparent that the embodiments can be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation. The embodiments have been numbered first embodiment, second embodiment, etc. as a matter of descriptive convenience and are not intended to have any other significance or provide limitations for an embodiment. For reference purposes the data surface of the media is defined as being "horizontal" though it is understood that the electronic system can operate at any angle. Position of the head over the media is referred to as a "vertical" displacement or flying height.

Figures 1A, 1B, 1C:
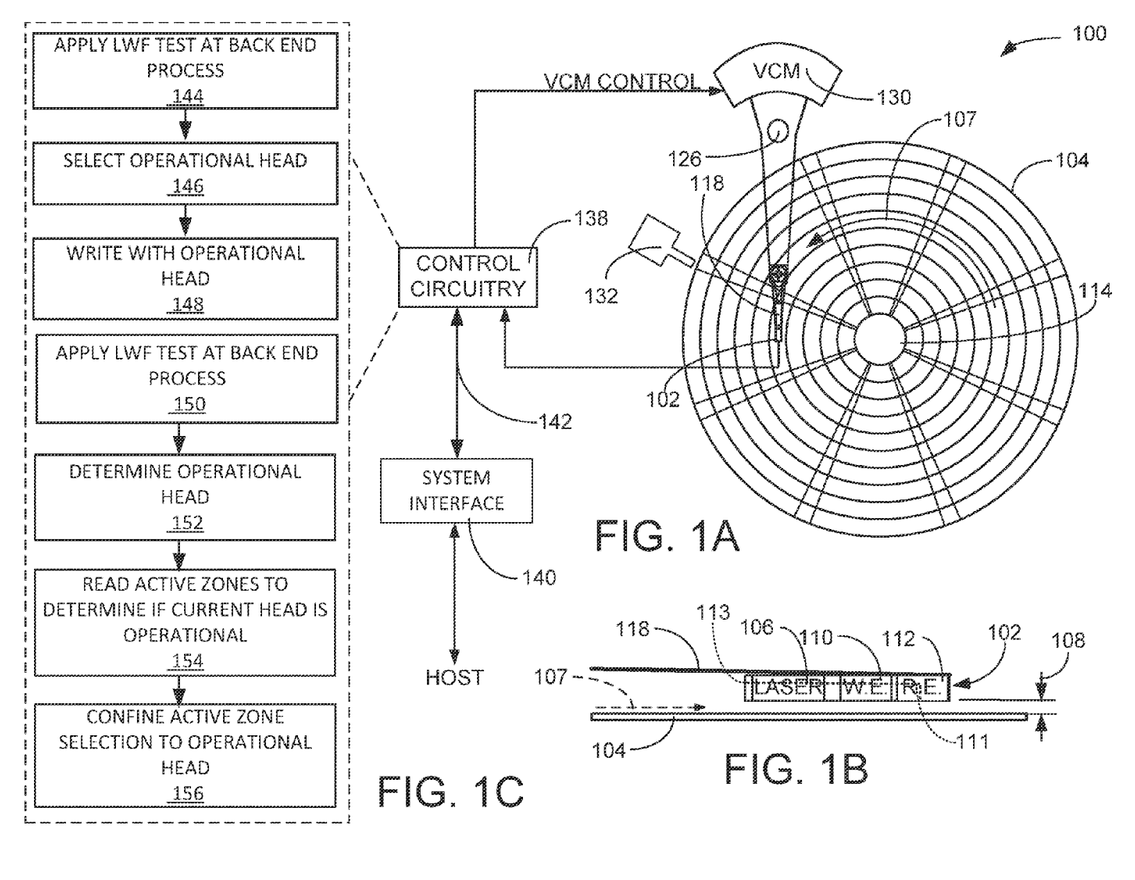
FIGS. 1A, 1B, and 1C show an operational diagram of an electronic system according to an embodiment.

Referring now to FIGS. 1A, 1B, and 1C, therein are shown an operational diagram of an electronic system 100 according to an embodiment. The electronic system 100 can represent an apparatus for one of the embodiments. An embodiment depicted in FIGS. 1A, 1B, and 1C is shown as a hard disk drive, as an example, although it is understood that the electronic system 100 as the embodiment can be a tape drive, a solid-state hybrid disk drive, or other magnetic media-based storage device. Further for example, the electronic system 100 can represent a desktop computer, a notebook computer, a server, a tablet, a television, a household appliance, or other electronic systems utilizing magnetic media storage.

The electronic system 100 including a head 102 actuated over a media 104. The head 102 can be mounted to a flex arm 118 attached to an actuator arm 122. The head 102 (FIG. 1B) can optionally include a laser 106 for heating the media 104 during part of a write process (e.g., the head is part of an Energy-Assisted Magnetic Recording (EAMR) drive). The flying height 108 can be adjusted (e.g., by use of a heater element in the head not shown in FIG. 1B) while writing data to the media 104 or as an error recovery process during reading from the media 104. Also in an embodiment of FIG. 1B, the head 102 comprises a write element 110 (e.g., an inductive coil) and a read element 112 (e.g., a magnetoresistive read element).

The media 104 is a structure for storing information. For example, the media 104 can be made of an aluminum alloy, ceramic/glass, or a similar non-magnetic material. The top and bottom surfaces of the media 104 can be covered with magnetic material deposited on one or both sides of the media 104 to form a coating layer capable of magnetization. As an example, the media 104 can be a disk platter for one embodiment of the electronic system 100 as a rotating storage system, such as a hard disk drive (HDD). As a further example, the media 104 can be a linear magnetic strip for one embodiment of the electronic system 100 as a linear storage system, such as a tape drive.

The laser 106, as an example, can be a laser diode or other solid-state based lasers. In addition, embodiments can employ any suitable techniques for focusing the laser 106 on the media 104, such as a suitable waveguide, magnifying lens, or other suitable optics. The laser 106 is increased to a write power in order to heat the disk, thereby decreasing the coercivity of the media 104 so that the data is written more reliably.

The spindle motor 114 can rotate the media 104, about a center of the media 104, at constant or varying speed 107. For illustrative purposes, the spindle motor 114 is described as a motor for a rotation, although it is understood that the spindle motor 114 can be other actuating motors for a tape drive, as an example.

As examples, a motor assembly 130 can be a voice coil motor assembly, a stepper motor assembly, or a combination thereof. The motor assembly 130 can generate a torque or force for positioning the head 102.

A tapered end of the flex arm 118 can include the head 102. The flex arm 118 can be mounted to the actuator arm 122, which is pivoted around a bearing assembly 126 by the torque generated by the motor assembly 130. The head 102 can include a single instance of the write element 110 and a single instance of the read element 112 that is narrower than the write element 110. The head 102 can fly over the media 104 at a dynamically adjustable span of the flying height 108, which represents a vertical displacement between the head 102 and the media 104. The head 102 can be positioned by the flex arm 118 and the actuator arm 122 and can have the flying height 108 adjusted by control circuitry 138.

The head 102 can be positioned over the media 104 along an arc shaped path between an inner diameter of the media 104 and outer diameter of the media 104. For illustrative purposes, the actuator arm 122 and the motor assembly 130 are configured for rotary movement of the head 102. The actuator arm 122 and the motor assembly 130 can be configured to have a different movement. For example, the actuator arm 122 and the motor assembly 130 could be configured to have a linear movement resulting in the head 102 traveling along a radius of the media 104.

The head 102 can be positioned over the media 104 to create magnetic transitions or detect magnetic transitions from the coating layer that can be used to representing written data or read data, respectively. The position of the head 102 and the speed 107 of the media 104 can be controlled by the control circuitry 138. Examples of the control circuitry 138 can include a processor, an application specific integrated circuit (ASIC) an embedded processor, a microprocessor, a hardware control logic, a hardware finite state machine (FSM), a digital signal processor (DSP), digital circuitry, analog circuitry, optical circuitry, or a combination thereof. The control circuitry 138 can also include memory devices, such as a volatile memory, a nonvolatile memory, or a combination thereof. For example, the nonvolatile storage can be non-volatile random access memory (NVRAM) or Flash memory and a volatile storage can be static random access memory (SRAM) or dynamic random access memory (DRAM).

A system interface 140 can couple the control circuitry 138 to a host electronics (not shown). The system interface 140 can transfer user data 142 between the host electronics and the control circuitry 138. The user data 142 can be encoded or decoded by the control circuitry 138 in preparation for transfer to or from the media 104.

The control circuitry 138 can be configured to control the spindle motor 114 for adjusting the speed 107 of the media 104. The control circuitry 138 can be configured to cause the head 102 to move relative to the media 104, or vice versa. The control circuitry 138 can also be configured to control the flow of information to the head 102 for writing to the media 104. The information sent to the head 102 can include the preconditioning pattern, direct current erase signals, user data, or a combination thereof.

Lube waterfall (LWF) is a transient phenomenon that affects recording performance when a head 102 is loaded after extended flying followed by a long duration of parking on a loading ramp 132. During extended actuation of the head 102, lube is picked up from the surface of the media 104, and moved to a deposit end 111 of the head 102. When the head 102 rests on the loading ramp 132, lube flows back to and coats the air bearing surface (ABS) 113, due to free energy decrease and diffusion effect. When the head 102 is relocated from the loading ramp 132 to the media 104, the head 102 can fly too high above the media 104 due to the extra coating of lube that has migrated onto the ABS 113. Writing data with excessive fly height or magnetic spacing can cause write errors due to the poor magnetic coupling between the head 102 and the media 104. Typically after 1-2 minutes of operation the head 102 will return to the normal fly height because the lube moves back to the deposit end 111 due to air flow.

The detrimental effect of LWF is proportional to the sensitivity of recording performance of the head 102 and media 104 pair due to magnetic spacing variation. The sensitivity of recording performance of the head 102 and media 104 pair increasing with increasing Bits per Inch (BPI) density. In other words, the impact of this issue will constantly increase as drive capacity increases.

The failure probability due to LWF has been observed to be drastically different between "serpentine" and "ordered zone" drive architecture. The serpentine architecture can perform writes on each of the heads in a disk drive before switching to the next sequential track to continue writing. By forcing the drive to write using all the heads 102 within the first few minutes of write upon power-on, the serpentine architecture has more chance to produce a write error since, if any head 102 in an electronic system 100 is susceptible to LWF-induced failure, the failure probability is 100%.

In contrast, the ordered zone architecture can spend the entire duration of the transient LWF condition writing on a single head 102. The ordered zone architecture has a failure probability between 1/n (n=number of head in drive) and 100%.

The transient LWF susceptibility can be measured during the manufacturing process by a LWF stress test. For example the LWF stress test consists of (i) measuring write capability parametric, e.g., Over Write (OW), Error Margin (EM), Resolution (RES), (ii) parking head 102, on the loading ramp 132, for 5 hours or more (pre-conditioning time) with power off, (iii) power on, load the head 102 from the loading ramp 132 to the media 104 and immediately issue a time-limited (e.g., 2 minutes) write command, (iv) measure OW & EM after write command completion, (v) read back the written data with error retries disabled for determining the margin data, including the over write and the error margin. The heads 102 demonstrating high LWF susceptibility will be detected by errors written to the media. Margin data of the head 102 against LWF susceptibility will be ranked by OW & EM delta between pre-conditioning measurements and post-test results.

As determined by LWF testing, the flying height increase due to LWF significantly varies between the heads 102, within an electronic system 100, and there are statistically 10%, as an example, of the heads 102 that demonstrate high sensitivity to lubricant waterfall (LWF) testing. On the other hand, there is a very high probability that any of the electronic system 100 has at least one of the heads 102 with very low or no sensitivity to LWF.

In one embodiment, the electronic system 100 further comprises control circuitry 138 configured to execute the flow diagrams of FIG. 1C. As an example, blocks 144 to 148 can represent the flow diagram where an embodiment is employing conventional magnetic recording (CMR). As a further example, blocks 150 to 156 can represent the flow diagram where an embodiment is employing shingled magnetic recording (SMR).

For an embodiment with CMR, in the block 144, this step can apply to an embodiment undergoing LWF stress test, for example, during the Back End process for the electronic system 100, such as a manufacturing test fixture, a hard disk drive, a tape drive, or a hybrid drive. This step can also measure the susceptibility of the head 102 or multiple instances of the head 102 to LWF. For example, Pass/Fail can be determined by evaluating margin data, such as OW/EM/RES performance, of each head 102 with optimized pass/fail limits. If no head 102 can pass this test, the electronic system 100 fails the BE process. In one embodiment, the failure rate and yield loss is very low since a drive passes if at least one head 102 in it passes the limits.

In the block 146, this step selects the operational heads 102. The operational heads 102 are operational or acceptable within pass limits under the LWF stress test. In an embodiment, this step can also select the most robust head 102 out of those that are operational. A most robust head 102 is one that is less susceptible to LWF. A record in the boot block can be updated to reflect which of the heads 102 demonstrates the least susceptibility to the LWF criteria. The boot block can list all of the heads, which demonstrate acceptable performance based on the LWF test criteria, in priority order.

In the block 148, this step can write to a media based cache (MBC), using one of the operational heads 102 or as a more specific example the most robust head 102 against LWF. The selection of one of the operational heads 102, which is not necessarily the most robust head 102 under LWF stress test, can provide performance improvements for the write operation if, for example, that head 102 is already on the side of the media 104 where the media based cache is to be written.

As an example, this step can take place after a power on. The media based cache can be a portion of the media 104 reserved for use as a cache. Other examples for the cache can include non-volatile memory as part of the electronic system 100, volatile memory as part of the electronic system 100, user area on the media 104, on a side or a portion of a side of the media 104, or a combination thereof.

For an embodiment with SMR, in the block 150, this step can apply to an embodiment undergoing LWF stress test, for example, during the Back End process for the electronic system 100, such as a manufacturing test fixture, a hard disk drive or tape drive or a hybrid drive. This step can also measure the susceptibility of the head 102 or multiple instances of the head 102 to LWF. For example, Pass/Fail can be determined by evaluating the margin data, such as OW/EM/RES performance, of each head 102 with optimized pass/fail limits. If no head 102 can pass this test, the electronic system 100 fails the BE process. In one embodiment, the failure rate and yield loss is very low since a drive passes if at least one of the heads 102 in it passes the limits.

In the block 152, this step selects the operational heads 102. These heads 102 are operational within pass limits under the LWF stress test. In an embodiment, this step can also select the most robust head 102 out of those that are operational. A most robust head 102 is one that is the least susceptible to LWF. This step can determine the most robust (least susceptible) head 102 and save this determination for later use. The saved determination can list all of the heads, which demonstrate acceptable performance based on the LWF test criteria, in priority order.

In the block 154, this step can, for example, takes place after a power up and/or during the reading of the current active zones/heads for host writes, garbage collection and/or defragmentation. The step can interrogate an active zones table to determine if the current selected head 102 is operational or the most robust for LWF. If not, this step can close the active zone and select a new zone from the pool of free zones with the operational head 102 or the most robust head 102 for LWF operations. The active zones table can be read from the media 104 as part of the power-on initialization process and subsequent accesses can be from memory managed by the control circuitry 138.

In the block 156, this step can continue to confine the active zone selection process to the operational head 102, or the most robust head 102 having available zones, for a predetermined period of time. During the predetermined period of time all write commands received from the system interface 120 can be constrained to the active zone and the operational head, without regard to the destination logical block address of the write command. The active zone provides a media based cache accessed by the operational head for all write commands during the predetermined period of time.

It has been discovered that an embodiment of the electronic system 100 can improve manufacturing yield. By way of an example, testing a prior art disk drive, having 10 of the heads 102, for the LWF condition by the prior art method (all heads must pass LWF test) can typically identify 5% of the prior art disk drives that fail to meet requirements. An embodiment of the electronic system 100 can reduce the LWF failure rate to 0% because the probability that any single unit of the head 102 will pass the LWF test is 99.5%. Similarly the prior art disk drive having two heads tested by the prior art LWF method can identify 1% of the manufacturing volume that fails the LWF test. An embodiment of the electronic system 100 can reduce the LWF failure rate to 0% for a two head version because the probability that any single unit of the head 102 will pass the LWF test is 99.5%.

Additional details related to the flow diagrams will be provided below in conjunction with FIGS. 2-3.

It has been discovered that an embodiment improves yield from the manufacturing line while providing good drives that can operate through the transient effects from LWF. While failure probability due to LWF on serpentine architecture is 100% of the head-basis probability (10-20%), and the ordered zone architecture has a failure probability between (1/n)x and 1x (10-20%), the method herein described has a failure probability of near 0% in the field since drive will be screened in the Back End process. While a direct drive process screen can achieve the same result, it will generate high yield loss since the performance of a drive is judged by the performance of the weakest head within the drive, while an embodiment will judge drives by the strongest head performance and yield loss will be negligible.

An embodiment can be implemented in firmware to select the head 102, recorded in the boot block, that will write to the media based cache, for the first few minutes after power on, in spite any host commands to write to specific logical block address (LBA). This will eliminate lube waterfall (LWF) induced failures in the electronic system 100.

Figure 2:
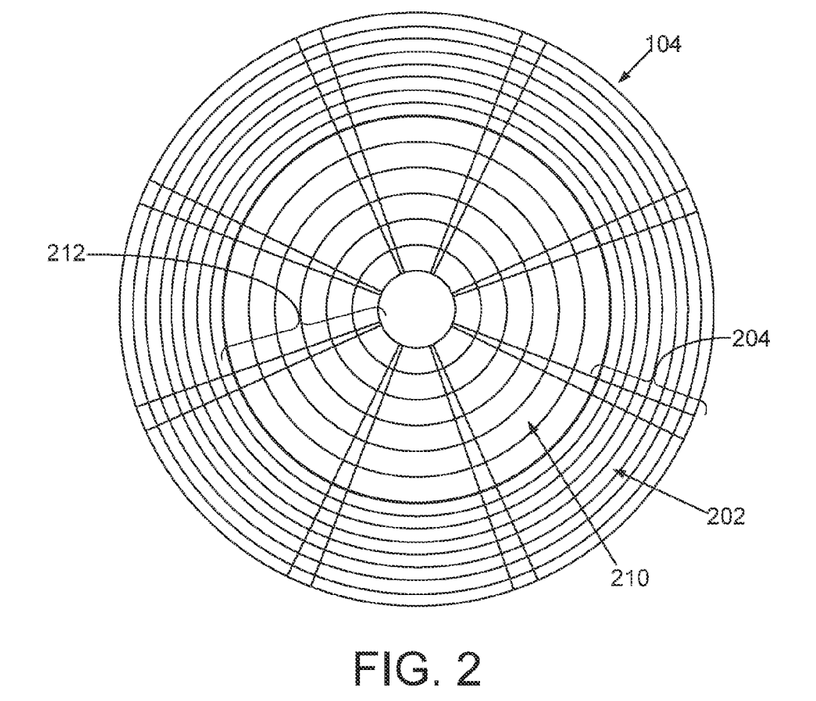
FIG. 2 provides a geometrical representation of a media of the electronic system according to one embodiment.

Referring now to FIG. 2, therein is shown a geometrical representation of a media 104 of the electronic system 100 of FIGS. 1A-C according to an embodiment. In an embodiment shown in FIG. 2, shingle data tracks 202 in the shingle zone 204 can be written in an overlapping manner. Overlapping the shingle data tracks 202 increases the radial density of the media 104, thereby increasing the capacity of the electronic system 100, as an example. The shingle data tracks 202 can be written as a circular pattern as illustrated in FIG. 2, where the shingle data tracks 202 are written from the outer diameter toward the inner diameter (or vice versa). Non-overlapping tracks are written in a non-shingle zone 212 in an embodiment, such as with conventional magnetic recording (CMR). While in this example the shingle zone 204 is depicted on the outer diameter relative to the non-shingle zone 212, the arrangement of the zones and the number of zones used may be different depending on implementation.

In one embodiment, frequently written logical block addresses (LBAs) can be written to the non-shingled data tracks 210 of a non-shingle zone 212 and infrequently written LBAs are written to the shingle data tracks 202 of the shingle zone 204. This increases the overall capacity of the electronic system 100 since the radial density or linear density of the shingle data tracks 202 can be significantly higher than the radial density of the non-shingled data tracks 210. The performance of the electronic system 100 is not significantly impacted by the clean-up process known as "garbage collection," which is performed on the shingle zone 204, since update writes occur at a lower frequency. The clean-up process can include an initialization of a number of the shingle data tracks 202 that require update and is performed by writing the preconditioning pattern across any residual information on the number of the shingle data tracks 202. Once the shingle data tracks 202 have been initialized, they are once again available for use.

In another embodiment, the lower radial density of the non-shingled data tracks 210 in the non-shingle zone 212 can increase performance by avoiding (or reducing) the need to perform write verify operations, whereas the higher radial density of the shingled shingle data tracks 202 in the non-shingle zone 212 can reduce performance due to a need to perform write verify operations. Storing data associated with infrequently written LBAs in the shingled shingle data tracks 202 of the shingle zone 204 reduces the frequency of corresponding write verify operations while increasing the overall capacity of the electronic system 100. Although FIG. 2 depicts a media with both a shingle and a non-shingle zone, in some embodiments the media 104 can include all shingled tracks or all non-shingled tracks.

For illustrative purposes, the media 104 is described with the data stored with the shingled structure or format with the shingle data tracks 202 and the shingle zone 204, although it is understood that the media 104 can be store user data and drive format data differently. For example, the media 104 can store user data or drive format data with non-overlapping format with data tracks and without the shingle zone 204.

Figure 3:
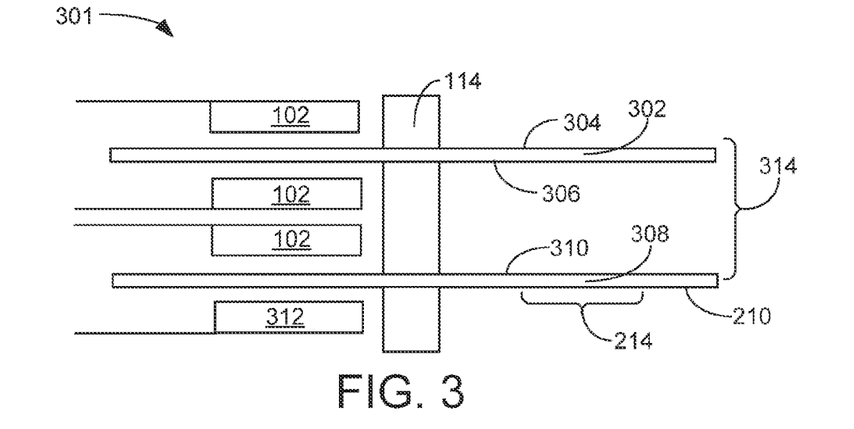
FIG. 3 is an example of a plurality of the head and a plurality of the media of the electronic system according to one embodiment.

Referring now to FIG. 3, therein is shown an example of a plurality of the heads 102 and a plurality of the media 104 of the electronic system 100 according to one embodiment. FIG. 3 depicts each of the media 104 as a disk platter and a pair of instances of the head 102 above and below the media 104.

As an embodiment, the MBC can be distributed among the recording sides for each of the media 104. The media 104 or the side of the media 104 designated for MBC, information (user data or drive formatting data) can have different formats than media 104 that are not designated as MBC. For example, information written to MBC can be written with different track pitch, bit spacing/frequency, double writing (repeat same data or different coding scheme).

Designation of a portion of the media 104, a side of the media 104, or which of the head 102 for MBC can be done at manufacturing time. The designation for MBC can also be done in the field. The adjustment can be made as the head 102 and the media 104 combination has degraded in the field.

Among the plurality of the head 102, one or some can be determined to be the most robust or less susceptible to LWF failures. The most robust head 102 can be designated as the operational head 102 and can be used to write to the active zone on its surface of the media 104 as the MBC for the predetermined time of the transient LWF condition.

In an attempt to shorten the duration of the transient LWF condition, the control circuitry 138 of FIG. 1A can activate the laser 106 of FIG. 1B for all of the heads from initial power on. The heat generated by the laser 106 can reduce the viscosity of the lube on the ABS 113 of FIG. 1B. The reduced viscosity can aid in the shortening of the time required for removal of the lube from the ABS 113. The control circuitry 138 can choose to deactivate the laser 106 when the head 102 is loaded from the loading ramp 132 of FIG. 1A to the media 104.

Figure 4:
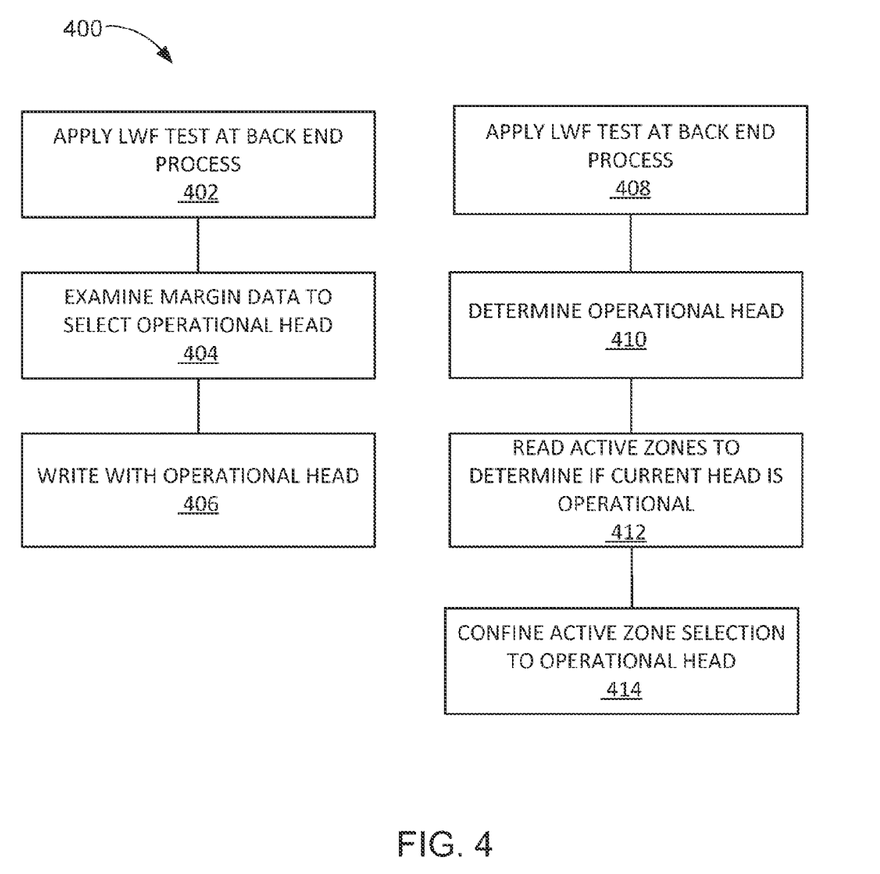
FIG. 4 is a flow chart of a method of operation of an electronic system in an embodiment.

Referring now to FIG. 4, therein is shown a flow chart of methods 400 of operation of an electronic system 100 in an embodiment utilizing CMR and SMR. The method 400 with CMR includes: applying LWF stress test during a Back End (BE) process, and measuring head susceptibility to LWF in a block 402; examining margin data for selecting a head determined to be operational under LWF stress test in a block 404; writing with the operational head in a block 406 (e.g., writing to an MBC).

The method 400 with SMR includes: applying LWF stress test during the Back End (BE) process, and measuring head susceptibility to LWF in a block 408; determining a head as operational under LWF and saving this determination in a block 410; during reading of current active zones/heads for host writes, garbage collection and/or defragmentation, determining if the current selected head is the operational head under LWF in a block 412; and continuing to confine the active zone selection process to the operational LWF head zones for predetermined time period, by closing the active zone accessed by the currently selected head, selecting a different active zone with one of the heads different from the currently selected head, or confining the selected different active zone to the operational head in a block 414.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment is that it valuably supports and services the historical trend of reducing costs, simplifying systems, and increasing performance.

These and other valuable aspects of an embodiment consequently further the state of the technology to at least the next level.

While the embodiment has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus comprising:
a media;
heads over the media; and
control circuitry, coupled to the heads, configured to:
   select an operational head from the heads based on margin data collected under a lube waterfall condition, and
   perform an access to the media with the operational head.

2. The apparatus as claimed in claim 1 wherein the operational head comprises at least one of the heads less susceptible to the lube waterfall condition.

3. The apparatus as claimed in claim 1 wherein the access comprises the access under the lube waterfall condition.

4. The apparatus as claimed in claim 1 wherein the access comprises a write.

5. The apparatus as claimed in claim 1 wherein the control circuitry is further configured to perform the access with the operational head for a pre-determined amount of time after a power on.

6. The apparatus as claimed in claim 1 wherein the control circuitry is further configured to determine an active zone on the media with a currently selected head.

7. The apparatus as claimed in claim 6 wherein the control circuitry is further configured to close the active zone accessed by the currently selected head.

8. The apparatus as claimed in claim 6 wherein the control circuitry is further configured to select a different active zone with one of the heads different from the currently selected head.

9. The apparatus as claimed in claim 8 wherein the control circuitry is further configured to confine the selected different active zone to the operational head.

10. The apparatus as claimed in claim 1 wherein the control circuitry is further configured to perform a write of the media with a currently selected head.

11. A method operating an apparatus including heads over a media, the method comprising:
   determining an operational head from the heads based on margin data collected under a lube waterfall condition; and
   performing an access to the media with the operational head.

12. The method as claimed in claim 11 wherein the operational head comprises at least one of the heads less susceptible to the lube waterfall condition.

13. The method as claimed in claim 11 wherein performing the access comprises performing the access under the lube waterfall condition.

14. The method as claimed in claim 11 wherein the access comprises a write.

15. The method as claimed in claim 11 wherein performing the access comprises performing the access with the operational head for a pre-determined amount of time after a power on.

16. The method as claimed in claim 11 wherein determining the operational head comprises determining an active zone on the media with a currently selected head.

17. The method as claimed in claim 16 wherein determining the operational head comprises closing the active zone accessed by the currently selected head.

18. The method as claimed in claim 16 wherein determining the operational head comprises selecting a different active zone with one of the heads different from the currently selected head.

19. The method as claimed in claim 18 further comprising confining the active zone on the media with the operational head.

20. The method as claimed in claim 11 wherein determining the operational head comprises performing a write of the media with the heads under the lube waterfall condition and reading from a currently selected head after the lube waterfall condition.

* * * * *